(No Model.) 2 Sheets—Sheet 1.
G. C. WITTE & R. D. MURRELL.
CHURN.
No. 327,912. Patented Oct. 6, 1885.
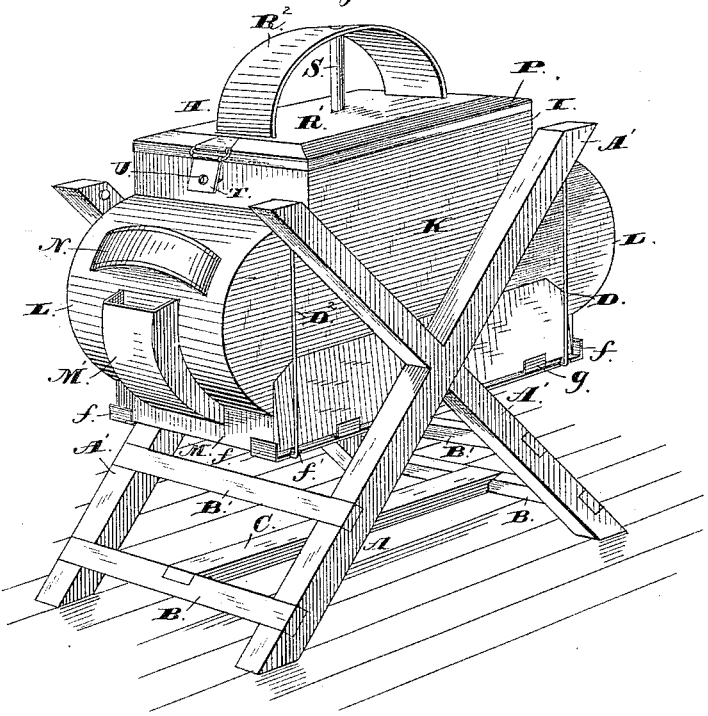
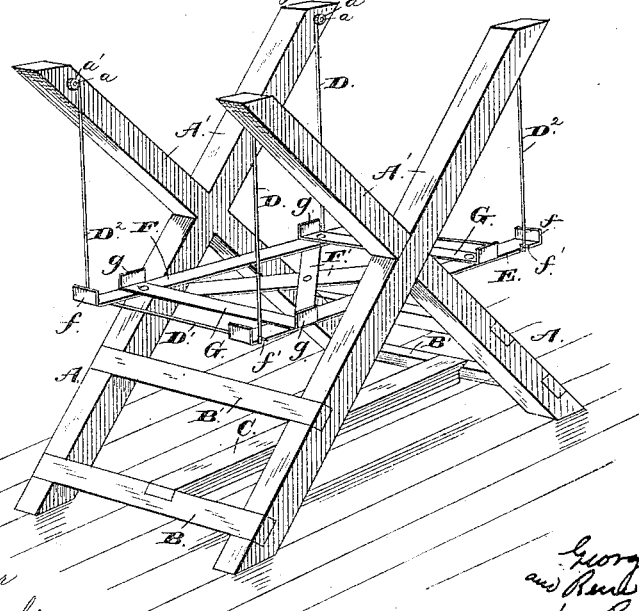

(No Model.) 2 Sheets—Sheet 2.
G. C. WITTE & R. D. MURRELL.
CHURN.
No. 327,912. Patented Oct. 6, 1885.
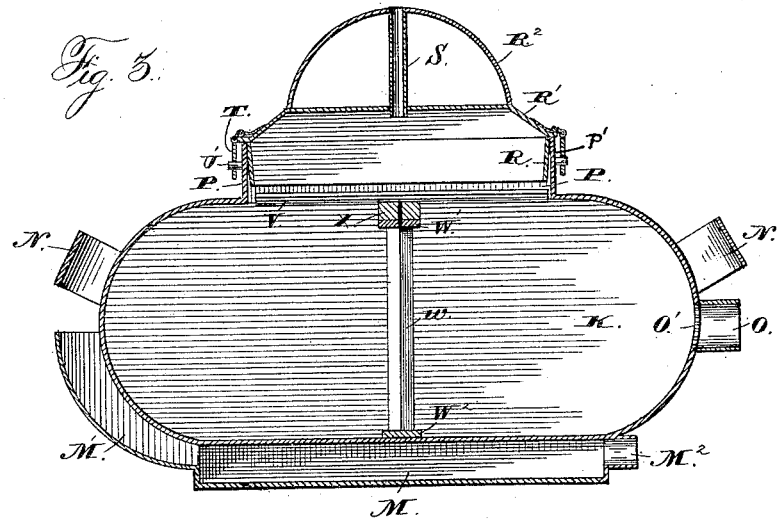
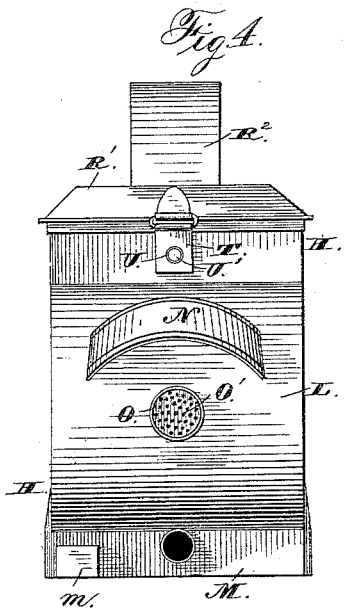
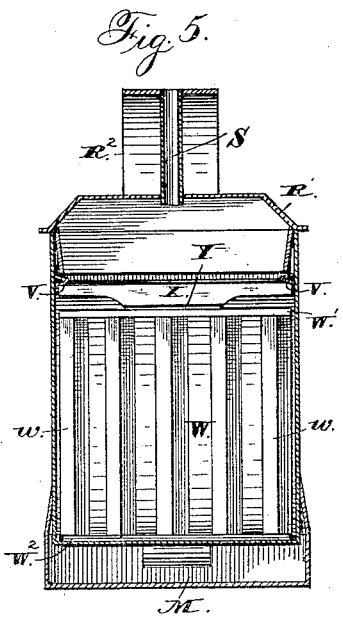
Witnesses:
J. C. Turner
Jas. E. Hutchinson
Inventors.
George C. Witte
and Rene D. Murrell
by Prindle & Russell
Attorneys

UNITED STATES PATENT OFFICE.

GEORGE C. WITTE, OF COVINGTON, AND RENE D. MURRELL, OF SOCIAL CIRCLE, GEORGIA.

CHURN.

SPECIFICATION forming part of Letters Patent No. 327,912, dated October 6, 1885.

Application filed April 9, 1884. Serial No. 127,209. (No model.)

*To all whom it may concern:*

Be it known that we, GEO. C. WITTE, of Covington, in the county of Newton, State of Georgia, and RENE D. MURRELL, of Social Circle, in the county of Walton, and in the State of Georgia, have invented certain new and useful Improvements in Churns; and we do hereby declare that the following is a full, clear, and exact description thereof, reference being had to the accompanying drawings, in which—

Figure 1 shows a perspective view of our improved churn; Fig. 2, a perspective view of the frame and swinging platform with the churn removed; Fig. 3, a longitudinal vertical central section of the churn proper; Fig. 4, an end elevation of the churn; Fig. 5, a transverse section of the churn proper.

Letters of like name and kind refer to like parts in each of the figures.

The object of our invention is to provide an improvement in churns; and to this end it consists in the construction, arrangement, and combination of parts, as hereinafter described and clearly set forth.

In the drawings, A A designate the sides of the churn-frame, which, as shown, consists of the crossed bars A' A'. The sides are connected by the transverse bars B B and B' B'. A longitudinal beam or bar, C, connects the lower bars, B B', so as to prevent effectually any tendency of the lower ends of the crossed bars A' A', forming either side of the frame, to move apart.

We do not limit ourselves to any means or manner of fastening the various frame-bars together, but prefer, wherever the end of one bar crosses or overlaps another bar, to let the former into the latter, and fasten it there by means of a nail, screw, or bolt, substantially as shown in the drawings.

From the inner sides of the upper ends of the bars A' A' extend the bolts $a\ a$, which can be screw-bolts, as shown, or not, as desired. Upon these bolts are washers $a'\ a'$. Suspended from the bolts are the wires or rods D D, which at their upper ends are looped around the bolts between the washers. Each of these rods or wires is bent, so as to have a horizontal portion, D', and two upright portions, $D^2\ D^2$, each one of which is, as indicated above, swung upon one of the bolts on the inner side of the frame. Resting upon the horizontal portions D' D' of these rods is the platform E, formed of the longitudinal side pieces, F F, turned up at each end at $f f$, and notched at $f' f'$, to receive the vertical portions of bent rods D D, as shown best in Fig. 2. As the platform is moved toward either end of the frame the pendent rods will be kept parallel to each other by the engagement of notches $f' f'$ with said rods.

The side bars, F F, of the platform are connected by the diagonal bars F' F', and by the transverse bars G G, which latter at the sides of the platform have portions $g\ g$ of their ends turned up.

The platform is preferably made of tin or other sheet metal, but we do not limit ourselves to any particular material therefor. Hung, as it is, at each end on the pivoted parallel supporting-rods, if it be moved toward either end of the frame it will always preserve a horizontal position. Resting on this platform, and held between the upturned ends of the longitudinal bars F F and the transverse bars G G, is the body of the churn, or the churn proper, H. This consists of the main portion I, with the vertical sides K K and the rounded ends L L.

The bottom and the ends are preferably formed of one piece or sheet of tin, as shown, each end being bent upward and backward toward the middle of the churn-body, the sides being each formed of a single sheet of metal.

Below the bottom of the churn, and extending up over a portion of the sides, is the box or jacket M, which is intended to contain cold water when it is desirable to cool the contents of the churn, and hot water for heating them.

A funnel or open pipe, M', is provided, extending up along one end of the churn and connected at its lower end with box or jacket M. By this water can be poured into the box as desired.

A discharge-pipe, $M^2$, serves to draw off the contents of the box as desired.

One of the upturned ends of one of the longitudinal bars F fits into a socket, $m$, on box M, and the other ends of the longitudinal and transverse bars embrace the squared ends and sides of the box, so that it is held from movement in either direction upon the platform.

Handles N are attached to each of the rounded ends L L of the churn, and at one of said ends, preferably at the same end as the discharge-pipe $M^2$, is the pipe O, opening into the churn, and provided with a strainer, $O'$.

In the top of the churn is a rectangular opening, P, surrounded by an upright flange, $P'$, within which fits a corresponding flange, R, on the cover $R'$. This cover is provided with a handle, $R^2$, on its top, and an air vent or pipe, S, extending up through the cover top and handle, as shown. The fastenings for this cover consist of the ears T T, hinged at each end thereof, and provided with holes U U, through which project the studs $U'$ $U'$ on the flange $P'$ when the ears are turned down. Along the sides of opening P are the inwardly-extending flanges V V.

The dasher W consists of the top and bottom bars, $W'$ $W^2$, between which are the upright bars or rods $w$ $w$, rectangular in cross-section, fixed between bars $W'$ $W^2$, with angles or corners presented toward the sides of the dasher. as shown.

Upon the top of the dasher, which is intended to be fixed and stationary within the churn, is pivoted the bar X, a distance-piece or washer, Y, being preferably placed between the bar X and the top bar, $W'$, of the dasher. The bar X is cut away underneath toward each end, so that it can be revolved on its pivot without striking the bar $W'$. When the dasher has been put in place within and across the churn, the bar X is turned, so that its ends come under flanges V V. By these flanges bearing upon the bar the dasher will be held in place with its bottom bar, $W^2$, forced against the churn-bottom. With this construction the dasher can be easily and readily removed and replaced.

The operation of our churn is as follows: Cold or hot water, as desired, is introduced into the box or jacket. As such box extends up over a portion of the churn sides, as well as along the bottom thereof, the contents of the churn will be quickly heated or cooled, according as hot or cold water is used. When the cream to be churned has been put into the churn-body and the dasher fixed in place, the cover is put on, and the operator, taking hold of one of the end handles, pulls and pushes the churn to and fro. Because of the way in which the platform is hung, the churn will in its movements always be horizontal, and one end will not be brought lower than the other, as is the case where the churn is hung from pivots over its center, or upon swinging rods not parallel to each other. The contents of the churn will consequently not be slopped over. The churn has merely an endwise and slightly rising, without any rocking, motion. The contents rush from end to end within the churn, passing through the dasher. As they rush toward either end of the churn they cannot strike squarely against the end, but rush up its curved inner face and are directed over and backward again toward the center of the churn. The cream will therefore receive a most thorough shaking up and churning without shock or jar, and without danger of spilling.

After the churning is completed the remaining milk or cream is poured out through pipe O, the strainer $O'$ serving to keep back and save any particles of butter.

Our churn, as constructed, it will also be observed, is free from any corners or crevices in which butter or cream might collect, and which cannot be thoroughly cleaned.

Having thus fully set forth the nature and merits of our invention, what we claim as new is—

1. In combination with the horizontal platform provided at its ends and sides with upwardly-projecting lugs, the swinging supporting-bars supporting the platform as it swings, and the churn adapted at its bottom to fit between the lugs on the ends and sides of the platform, and provided with a socket to receive one of such lugs, substantially as and for the purpose described.

2. In combination with the swinging platform composed of longitudinal and transverse bars turned up at their ends, the churn adapted at its bottom to rest on the platform and fit between the upturned ends of the platform-bars, and provided with a socket adapted to receive the upturned end of one of the longitudinal side bars of the platform, substantially as and for the purpose described.

In testimony that we claim the foregoing we have hereunto set our hands this 15th day of March, A. D. 1884.

GEORGE C. WITTE.
RENE D. MURRELL.

Witnesses:
J. W. ANDERSON,
JOSEPH HARRIS.